US011907682B2

(12) United States Patent
Hiscock (10) Patent No.: US 11,907,682 B2
(45) Date of Patent: Feb. 20, 2024

(54) DEVICE AND METHOD FOR GENERATING A RANDOM NUMBER DRAWN ACCORDING TO A NONUNIFORM DISTRIBUTION

(71) Applicant: Commissariat A L'Energie Atomique et aux Energies Alternatives, Paris (FR)

(72) Inventor: Thomas Hiscock, Grenoble (FR)

(73) Assignee: Commissariat A L'Energie Atomique et aux Energies Alternatives, Paris (FR)

(*) Notice: Subject to any disclaimer, the term of this patent is extended or adjusted under 35 U.S.C. 154(b) by 474 days.

(21) Appl. No.: 17/145,787

(22) Filed: Jan. 11, 2021

(65) Prior Publication Data
US 2021/0216283 A1 Jul. 15, 2021

(30) Foreign Application Priority Data
Jan. 14, 2020 (FR) .................... 20 00335

(51) Int. Cl.
*G06F 7/58* (2006.01)
(52) U.S. Cl.
CPC .................... *G06F 7/58* (2013.01)
(58) Field of Classification Search
CPC ............................ G06F 7/58–588
See application file for complete search history.

(56) References Cited

U.S. PATENT DOCUMENTS

2006/0015549 A1* 1/2006 Chren ................. G06F 7/58
708/446

OTHER PUBLICATIONS

C. Aguilar-Melchor, M. R. Albrecht, and T. Ricosset, 'Sampling from Arbitrary Centered Discrete Gaussians for Lattice-Based Cryptography', in Applied Cryptography and Network Security, 2017, pp. 3-19. (Year: 2017).*

(Continued)

*Primary Examiner* — Jyoti Mehta
*Assistant Examiner* — Vivian Diem Ha Ledynh
(74) *Attorney, Agent, or Firm* — Oblon, McClelland, Maier & Neustadt, L.L.P.

(57) ABSTRACT

This device comprises a fast sampler comprising:
a truncated table associating with truncated random numbers $r_{msb}$ coded on $N_{msb}$ bits, the only sample k for which, whatever the number $r_{lsb}$ belonging to the interval $[0; 2^{N_r - N_{msb}} - 1]$, the following condition is met: $F(k-1) < (r_{msb}, r_{lsb}) \leq F(k)$, where:
($r_{msb}$, $r_{lsb}$) is the binary number coded on $N_r$ bits and the $N_{msb}$ most significant bits of which are equal to the truncated random number $r_{msb}$ and the ($N_r - N_{msb}$) least significant bits of which are equal to the number $r_{lsb}$;
$N_{msb}$ is an integer number lower than $N_r$,
a module for searching for a received truncated random number $r_{msb}$ in the truncated table, and able to transmit the sample k, associated, by the truncated table, with the received truncated random number $r_{msb}$, by way of random number drawn according to the probability distribution ρ.

11 Claims, 6 Drawing Sheets

10 – Device
12 – Random Number Generator
14 – Fast-sampling level
16 – Slow sampling level
18 – Memory
20 – Pre-stored truncated table
22 – Searching Module
24 – Output interface
26 – Interface
28 – Interface
40 – Slow sampler
42 – Memory
44 – Pre-stored complete table
46 – Searching module
50 – Set of memories
60 – Multiplexer
62 – Output
70 – Arbitrating module

(56) References Cited

OTHER PUBLICATIONS

French Preliminary Search Report dated Sep. 8, 2020 in French Application 20 00335 filed Jan. 14, 2020 (with English translation of Categories of Cited Documents and Written Opinion), 9 pages.

Peikert, C., "An Efficient and Parallel Gaussian Sampler for Lattices," Annual International Conference on the Theory and Applications of Cryptographic Techniques, Eurocrypt 2018, Aug. 15, 2010, XP047270451, 18 pages.

Du, C. et al., "Towards Efficient Discrete Gaussian Sampling for Lattice-Based Cryptography," 2015 $15^{th}$ International Conference on Field Programmable Logic and Applications (FPL), Sep. 2, 2015, XP032791503, 6 pages.

Pöppelmann, T. et al., "Enhanced Lattice-Base Signatures on Reconfigurable Hardware Extended Version," extracted Aug. 12, 2020: https://eprint.iacr.org/2014/254.pdf, Feb. 20, 2015, XP055721929, 24 pages.

Pöppelmann, T. et al., "Towards Practical Lattice-Based Public-Key Encryption on Reconfigurable Hardware," International Conference on Selected Areas in Cryptography—SAC 2013, Lecture Notes in Computer Science, vol. 8282, https://doi.org/10.1007/978-3-662-43414-7_4, 18 pages.

Pöppelmann, T. et al., "Enhanced Lattice-Base Signatures on Reconfigurable Hardware," CHES 2014, Lecture Notes in Computer Science, vol. 8731. https://doi.org/10.1007/978-3-662-44709-3_20, Sep. 2014, 18 pages.

Lhubashevsky, V., "Lattice Signatures Without Trapdoors," Proceedings of the 31st Annual international conference on Theory and Applications of Cryptographic Techniques, DOI: : 10.1007/978-3-642-29011-4_43, 2011, 24 pages.

Liu, Z. et al., "High-Performance Ideal Lattice-Based Cryptography on 8-bit AVR Microcontrollers," AMC Transactions on Embedded Computing Systems, vol. 7, No. 7, Feb. 2016, 25 pages.

Khalid, A. et al., "Compact, Scalable and Efficient Discrete Gaussian Samplers for Lattice-Based Cryptography," IEEE International Symposium on Circuits and Systems (ISCAS), https://doi.org/10.1109/ISCAS.2018-8351009, 2018, 6 pages.

Göttert, N. et al., "On the Design of Hardware Building Blocks for Modern Lattice-Based Encryption Schemes," CHES 2012, Lecture Notes in Computer Science, vol. 7428, https://www.iacr.org/archive/ches2012/74280511/74280511.pdf, 2012, 18 pages.

Dwarakanath, N. C. et al., "Sampling From Discrete Gaussians for Lattice-Based Cryptography on a Constrained Device," Applicable Algebra in Engineering Communication and Computing, vol. 25, No. 3, Jun. 2014, 17 pages.

Roy, S. S. et al., "Compact Ring-LWE Cryptoprocessor," CHES 2014, Lecture Notes in Computer Science, vol. 8731, https://doi.org/10.1007/978-3-662-44709_21, 2014, 21 pages.

\* cited by examiner

DEVICE AND METHOD FOR GENERATING A RANDOM NUMBER DRAWN ACCORDING TO A NONUNIFORM DISTRIBUTION

The invention relates to a device and method for generating a random number coded on $N_k$ bits and drawn according to a nonuniform, discrete and bounded probability distribution. The invention also relates to a storage medium for implementing this method.

A nonuniform probability distribution is a probability distribution different from a uniform distribution. A uniform distribution is a distribution the probability density of which is constant on its support.

Such devices are, for example, used in cryptography and, in particular, in the field of cryptography based on Euclidean lattices. Cryptography based on Euclidean lattices is a very active branch of cryptography. It allows effective and conjectured schemes that are resistant to quantum computers, or even advanced primitives such as homomorphic encryption or identity-based encryption to be constructed. Mention may be made by way of example of the encryption schemes LWE ("Learning With Error") and Ring-LWE, or even of the signature scheme BLISS ("Bimodal Lattice Signature Scheme") and homomorphic encryption schemes such as the FV or BGV ("Brakerski-Gentry-Vaikuntanathan") scheme.

A specificity common to a great many schemes based on Euclidean lattices is the need to generate random numbers drawn according to a nonuniform, discrete and bounded probability distribution such as a Gaussian distribution.

Prior art is known from:
Peikert Chris E D et al.: "An efficient and parallel Gaussian sampler for lattices", 15 Aug. 2010, Annual International Conference on the Theory and applications of cryptographic techniques, Eurocrypt 2018, Berlin, Heidelberg, pages 80-97,
Chaohui Du et al.: "Toward efficient discrete Gaussian sampling for lattice-based cryptography", 2015 25th International Conference on Field Programmable Logic and Application, Imperial College, Feb. 9, 2015, pages 1-6,
Thomas Poppelman et al.: "Enhanced Lattice-Based Signature on Reconfigurable Hardware Extended Version", 20 Feb. 2015,
The invention aims to provide such a device for generating a random number drawn according to a nonuniform, discrete and bounded distribution that is faster than known devices. One of the subjects thereof is therefore such a device for generating random numbers.

Another subject of the invention is a method for generating a random number.

Another subject of the invention is a data-storage medium that is readable by a microprocessor and comprising instructions for executing the above method for generating a random number when these instructions are executed by the microprocessor.

The invention will be better understood on reading the following description, which is given merely by way of non-limiting example, and with reference to the drawings, in which.

Below, the definitions, notations and conventions used throughout this text are first described in section I. Next, a detailed example of an embodiment is described in section II with reference to the figures. In the subsequent section, Section III, variants of this detailed embodiment are presented. Lastly, in section IV, the advantages of the various described embodiments are listed.

Section I: Definitions, Notations and Conventions

In the remainder of this description, features and functions that are well known to a person skilled in the art are not described in detail.

The term "binary value" of a number designates the value of this number expressed using the base 2.

The expression "a variable Y coded on N bits" means that the size of this variable Y, in number of bits, is equal to N.

In this text, random variables have been represented by capital letters X and instances of these variables X have been designated by lower-case letters x.

A probability distribution $\rho$ is a distribution that gives the probability $\rho(x)$ that an event x occurs, i.e. the probability $\rho(x)$ that the variable X is equal to x.

A continuous probability distribution is a distribution that is defined on a continuous support of values. In other words, the possible values x of the variable X form a continuous range of values, such as, for example, the set of real numbers.

Figure 1:
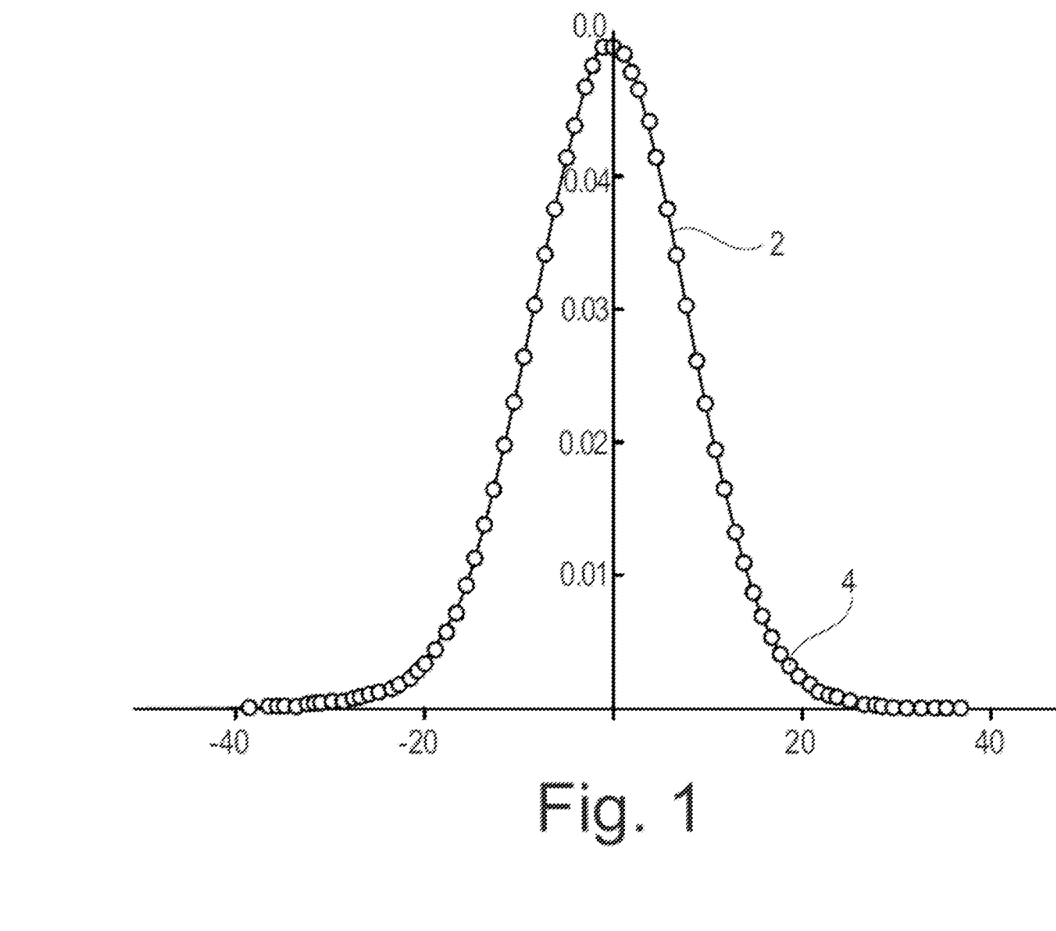
FIG. 1 is a schematic illustration of the probability density of a Gaussian distribution.

FIG. 1 shows a probability density 2 of a continuous Gaussian probability distribution.

A discrete probability distribution is a distribution that is defined on a discrete support of values. In other words, the possible values x of the variable X are discrete values, such as, for example, the set of integer numbers. The circles in FIG. 1 represent a discrete probability density 4 of a discrete Gaussian distribution.

A bounded probability distribution is a distribution that is defined on a bounded support. In other words, all the possible values x of the variable X belong to a bounded interval located between a lower bound $x_{min}$ and an upper bound $x_{max}$.

A Gaussian distribution (also called a normal distribution) is a distribution the probability density of which is defined by the following relationship, relationship (1):

$$\rho_{\mu,\sigma^2}(x) = \frac{1}{\sqrt{2\pi\sigma^2}} e^{-(x-\mu)^2/2\sigma^2}$$

where:
$\mu$ is the mean,
$\sigma$ is the standard deviation,
the symbol "e" designates the exponential function.

A discrete and bounded Gaussian distribution is defined by the following relationship, relationship (2):

$$P_{\mu,\sigma^2,I}(x) = \frac{\rho_{\mu,\sigma^2}(x)}{\sum_{k \in I} \rho_{\mu,\sigma^2}(k)}$$

where I is a bounded interval that contains all the possible discrete values x of the variable X.

Here, the interval I is a finite subset of the set of integer numbers.

The lower and upper bounds of the interval I are denoted $-n\sigma$ and $n\sigma$, respectively, where n is an integer number and $\sigma$ is the standard deviation of the discrete Gaussian distribution. To make the discrete and bounded Gaussian distribution $\rho_{\mu,\sigma,I}$ a good approximation of an unbounded Gaussian distribution, n is typically chosen to be higher than eight or ten. For example, below n is chosen to be equal to twelve.

To limit the size of the interval I, the standard deviation $\sigma$ is chosen to be small. In this text, the standard deviation $\sigma$ is considered to be small if it is lower than or equal to ten or five and, preferably, lower than or equal to four. In most concrete applications, the standard deviation $\sigma$ is chosen to be close to three.

Below, each discrete value of the interval I is called a "sample k". The number of samples k contained in the interval I is equal to $2^{N_k}$ where the number $N_k$ is an integer number. Here, each sample k is identified by an order number comprised between 0 and $2^{N_k}-1$. Below, to simplify the description, each sample k is set equal to this order number. Thus, each sample k is coded on $N_k$ bits.

A cumulative probability density, also known as a CDF (acronym of cumulative distribution function), is the function F that returns the probability F(x) that the variable X has a value lower than or equal to x. This cumulative probability density is constructed using the probability distribution $\rho$.

Below, the probability that the variable X has a value lower than or equal to k, in the case where the distribution $\rho$ is a discrete probability distribution defined on the support I, is denoted F(k). The probability F(k) is coded on $N_F$ bits. To obtain a good approximation of the continuous probability distribution, the number $N_F$ is conventionally higher than 16 or 32 and, preferably, higher than 64 or 128. For example, below, the number $N_F$ is equal to 128. As all the values F(k) are computed as a probability, they are comprised between 0 and 1.

Inversion sampling is a method in which:
a random number r is drawn according to a uniform probability distribution, then
a sampler searches for the only sample k that belongs to the interval I and for which the following condition, condition (1), is met: $F(k-1) < r \leq F(k)$, where:
F is the cumulative probability density of the probability distribution $\rho$, and
$\rho$ is a nonuniform probability distribution, then
the found sample k is transmitted by way of random number generated according to the distribution $\rho$.

Typically, the sample k is sought in a complete table that, with each sample k, associates the corresponding probability F(k). This table is often designated by the acronym LUT (standing for lookup table). The size of this table increases as the number $N_k$ increases. Typically, this table contains $2^{N_k}$ samples k.

Certain probability distributions, such as the Gaussian distribution of zero mean, have a probability density that is symmetric with respect to the sample k=0. Such a symmetric distribution is associated with a corresponding positive distribution $\rho'$ defined solely in the positive portion of the interval I. This positive distribution $\rho'$ is defined by the following relationship, relationship (3):

$$\rho'(0) = \rho(0) \quad \rho'(k) = 2\rho(k), k \in ]0; n\sigma]$$

Such a positive distribution $\rho'$ is advantageously used instead of the distribution $\rho$ in a sampler and, in particular, in a sampler that performs inversion sampling. Specifically, the positive distribution $\rho'$ is defined in an interval I' that is two times smaller than the interval I while preserving the ability to obtain, simply, samples k drawn according to the distribution $\rho$. More precisely, to do so, a sample k' is drawn according to the distribution $\rho'$ and a random bit b is drawn according to the uniform distribution. The sample k is then equal to $b_s k'$, where $b_s$ is equal to +1 when the random bit b drawn is equal to 1 and is equal to −1 when the random bit b drawn is equal to zero.

Section II: Examples of Embodiments

Figure 2:
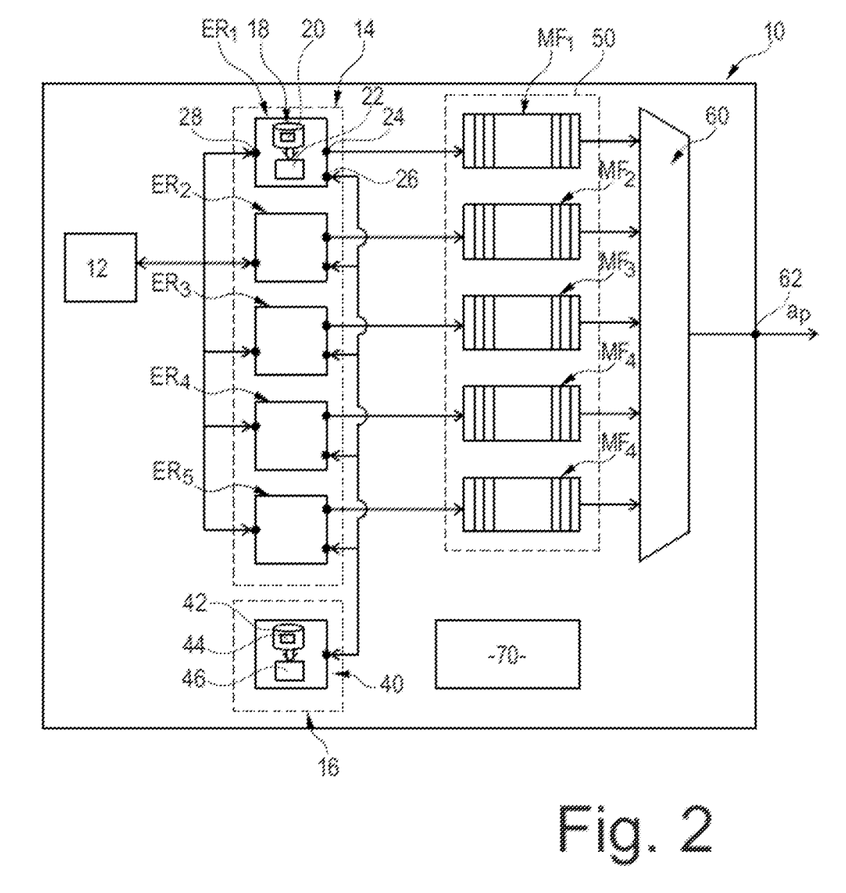
FIG. 2 is a schematic illustration of the architecture of a device for generating random numbers.

FIG. 2 shows a device 10 for generating a random number $a_I$ drawn according to a nonuniform, discrete and bounded probability distribution $\rho$. In this exemplary embodiment, the distribution $\rho$ is a discrete and bounded Gaussian distribution such as that defined in section I above. The mean p is here chosen to be equal to zero. The standard deviation $\sigma$ is higher than zero and, generally, lower than twenty or ten. In practice, the standard deviation $\sigma$ is often comprised between two and four. The bounded interval I in which the distribution $\rho$ is defined is equal to the interval $[-n\sigma; +n\sigma]$ with n lower than or equal to thirty or twenty. In practice, n is often lower than twelve. Here, n is comprised between eight and twelve.

In this embodiment, the device 10 is implemented in the form of a hardware device and each of the components of the device 10 described below takes the form of a hardware component.

The device 10 comprises:
a random number generator 12,
a fast-sampling level 14, and
a slow-sampling level 16.

The generator 12 is able to generate a random number r according to a uniform distribution, where r is a random number coded on $N_r$ bits. Here, the numbers $N_r$ and $N_F$ are equal. Here, the number $N_r$ is higher than 16 or 32 and, preferably, higher than or equal to 64 or 100 or 128. In this exemplary embodiment, the number $N_r$ is equal to 128. More precisely, the generator 12 is able to firstly generate the $N_{msb}$ most significant bits of the random number r, then, if necessary, to generate the $N_{lsb}$ least significant following bits of the random number r. Preferably, the number $N_{msb}$ is five or ten times smaller than the number $N_r$. The number $N_{msb}$ is here lower than or equal to ten and, preferably, higher than or equal to three or four. For example, in this embodiment, the number $N_{msb}$ is chosen to be equal to four. The number $N_{lsb}$ is equal to $(N_r - N_{msb})$.

The $N_{msb}$ most significant bits of the number r form a random number that is denoted $r_{msb}$ below. The $N_{lsb}$ least significant bits form a random number that is denoted $r_{lsb}$ below.

Figure 5:
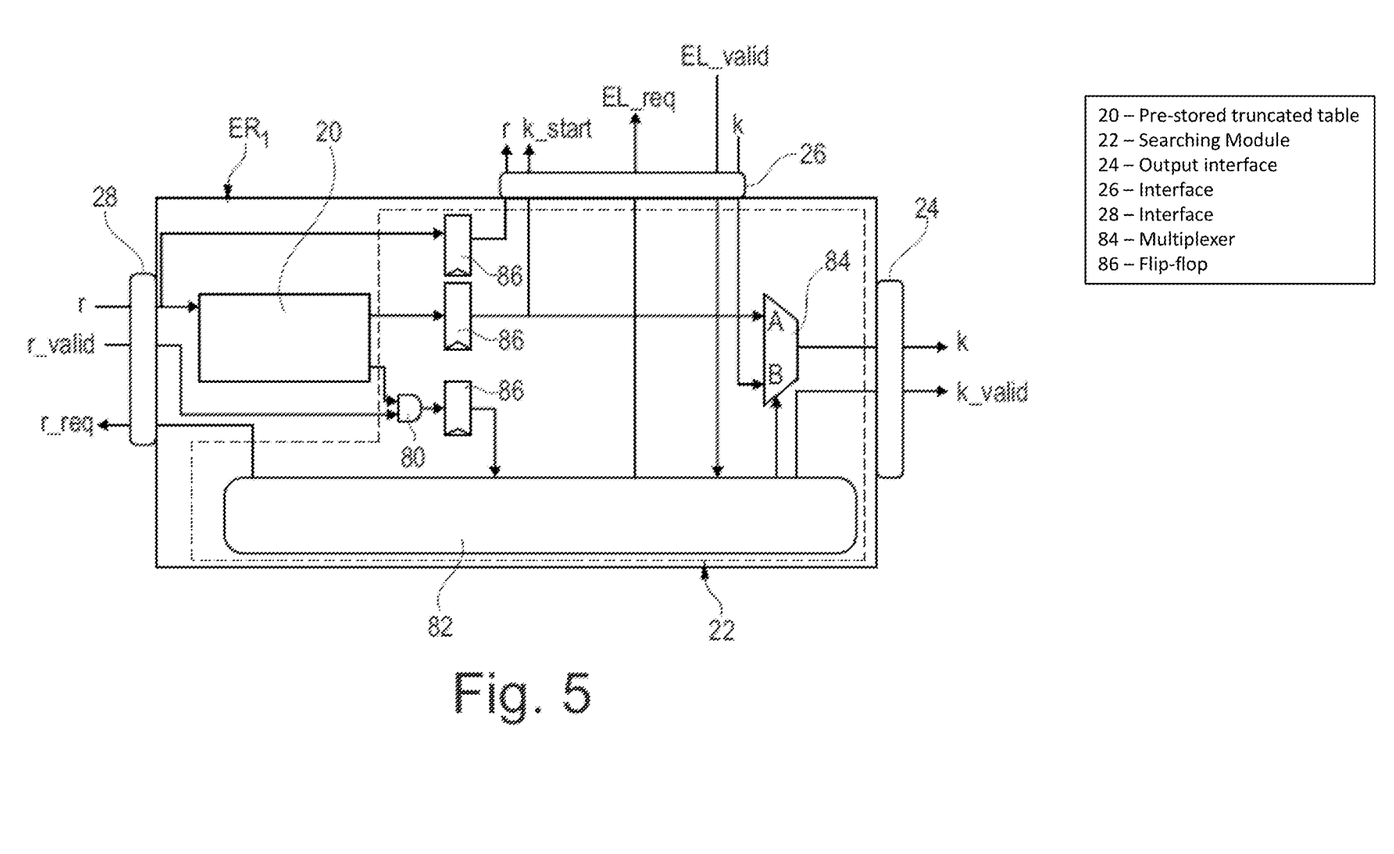
FIG. 5 is a schematic illustration of a hardware architecture of a fast sampler implemented in the device of FIG. 2.

For example, the generator 12 triggers the generation of the $N_{lsb}$ least significant bits in response to reception of a signal r_req (FIG. 5). For example, the generator 12 transmits a first notification in the form of a signal called "r_valid" (FIG. 5) when it has finished generating the $N_{msb}$ most significant bits of the random number r then a second notification r_valid when it has finished generating the $N_{lsb}$ least significant bits of the random number r.

Such generators are known and the generator 12 is therefore not described in more detail here.

The level 14 comprises $N_{ER}$ fast samplers $ER_i$. The index i is an identifier of the fast sampler. The index i is here an integer number comprised between 1 and $N_{ER}$. The number $N_{ER}$ is higher than or equal to one and, preferably, comprised between two and ten or between two and seven and even more advantageously between two and five. Here, the number $N_{ER}$ is chosen to be equal to five.

In this embodiment, the fast samplers $ER_i$ are identical to one another. Therefore, only the sampler $ER_1$ is described in more detail.

The sampler $ER_1$ is capable, in response to reception of the number $r_{msb}$, of transmitting the only sample k that meets the following condition, condition (2):

condition (2): Whatever the number $r_{lsb}$ belonging to the interval [0; $2^{Nr-Nmsb}-1$] the following relationship is respected: $F(k-1) < (r_{msb}, r_{lsb}) \leq F(k)$, where:

F is the cumulative probability density of the distribution ρ, $(r_{msb}, r_{lsb})$ is the binary number coded on $N_r$ bits and the $N_{msb}$ most significant bits of which are identical to the $N_{msb}$ bits of the number $r_{msb}$ and the $N_{lsb}$ least significant bits of which are identical to the $N_{lsb}$ bits of the number $r_{lsb}$.

The fast sampler $ER_1$ is also capable of sending a failure signal denoted "EL_req" (FIG. 5) that is transmitted to a slow sampler of level 16.

Condition (2) is considered to have been met only if there is a single sample k for which this condition, condition (2), is met.

To be able to rapidly find the sample k that meets condition (2) and, alternatively, to send the signal EL_req, the sampler $ER_1$ comprises:

a memory 18 containing a pre-stored truncated table 20, and a searching module 22.

The table 20 associates, with each number $r_{msb}$ that meets condition (2), the corresponding sample k, i.e. the only sample k such that $F(k-1) < (r_{msb}, r_{lsb}) \leq F(k)$, and does so for all the possible values of the number $r_{lsb}$. Specifically, it has been observed that for certain random numbers r, it is possible to find the sample k that meets condition (1) without using the $N_{lsb}$ least significant bits of this random number r.

In this embodiment, the table 20 takes the form of a one-dimensional table containing $2^{Nmsb}$ cells $C_j$. The $2^{Nmsb}$ cells $C_j$ are ordered in order of increasing index j, where j is an integer number comprised between 0 and $2^{Nmsb}-1$.

Each sample k for which there is a number $r_{msb}$ that meets condition (2) is stored in the cell the index j of which is equal to this number $r_{msb}$.

Condition (2) is met by only some of the possible numbers $r_{msb}$. Therefore, table 20 contains cells in which no sample k is stored. The index j of these cells is equal to the number $r_{msb}$ for which condition (2) is not met. In these cells, table 20 contains a failure symbol different from all the possible samples k. For example, here, the failure symbol is the symbol "?".

Figure 3:
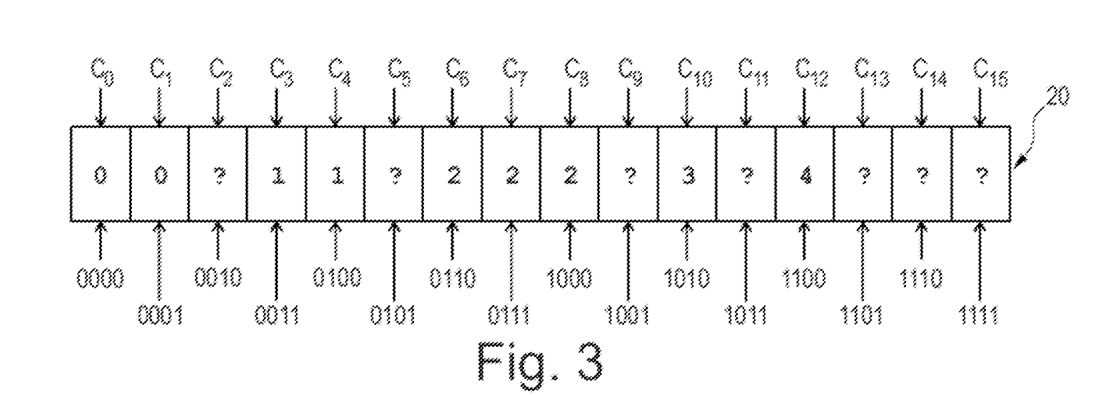
FIG. 3 is a schematic illustration of a truncated table implemented in the device of FIG. 2.
Figure 4:
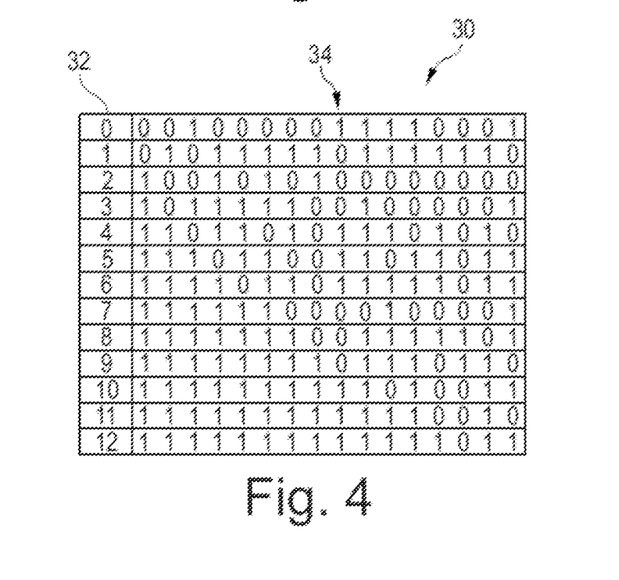
FIG. 4 is a schematic illustration of a simplified complete table implemented in the device of FIG. 2.

FIG. 3 illustrates the content of a table 20 in an extremely simplified case in which the interval I contains only thirteen samples k numbered from 0 to 12, each of these samples k also being associated with a corresponding probability F(k) by the complete table 30 of FIG. 4.

The table 30 comprises, for example, a first column 32 containing the samples k and a second column 34 containing the probability F(k) corresponding to each sample k. All the probabilities F(k) are lower than or equal to one. Under these conditions, here, the column 34 contains only the binary value of the decimal portion of the probability F(k). This binary value was computed using the discrete Gaussian distribution ρ. In the example shown in FIG. 4, the number $N_F$ is equal to sixteen and the probabilities F(k) are therefore each coded on sixteen bits.

In this simplified example, when the number $r_{msb}$ is equal to "0000" (binary value), condition (2) is met solely for k=0. Under these conditions, the value 0 is stored in cell $C_0$ of the table 20. Similarly, when the number $r_{msb}$ is equal to "1010" (binary value), condition (2) is met solely for k=3. Therefore, the value "3" is stored in cell $C_{10}$ ("10" in decimal is equal to "1010" in binary).

In contrast, when the number $r_{msb}$ is equal to "0010" (binary value), there is no sample k for which, whatever the value of the number $r_{lsb}$, condition (2) is met. Specifically, condition (2) is met for k=0 if the number $r_{lsb}$ is lower than or equal to F(0) and condition (2) is met for k=1 if the number $r_{lsb}$ is strictly higher than F(0). In other words, the four most significant bits of a random number r starting with "0010" are not sufficient to identify, unambiguously, the corresponding sample k. Under these conditions, the symbol "?" is stored in the cell $C_2$.

The searching module 22 is able to receive the number $r_{msb}$ and, in response, to transmit the corresponding sample k and, alternatively, to send the failure single EL_req. To do this, here, the module 22 reads, from the table 20, the content of the column $C_j$ the index j of which is equal to the received number $r_{msb}$. If the cell $C_j$ contains a sample k, the module 22 transmits the sample k contained in this cell to an output interface 24 of the sampler $ER_1$. If the cell $C_i$ contains the symbol "?", the module 22 sends the failure signal EL_req to an interface 26 connected to the slow-sampling level 16.

To receive the number $r_{msb}$ generated by the generator 12, the sampler $ER_1$ also comprises an interface 28 that connects it to the generator 12. Here, the interface 28 allows the complete random number r to be acquired and the interface 26 also allows this received complete random number r to be communicated to a slow sampler of the level 16.

In this embodiment, the slow-sampling level 16 comprises a single slow sampler 40. The slow sampler 40 is connected to the interface 26 of each fast sampler $ER_i$. It is thus able to exchange information with each of these fast samplers $ER_i$. In particular, the sampler 40 is able to receive the failure signal EL_req and a complete random number r generated by the generator 12 and, in response, to transmit the sample k corresponding to the received random number r to the fast sampler $ER_i$ that transmitted it the signal EL_req.

To determine the sample k that corresponds to the received random number r, the slow sampler 40 performs inversion sampling. To this end, it comprises:

a memory 42 containing a pre-stored complete table 44, and a searching module 46.

The table 44 associates with each sample k of the interval I the corresponding probability F(k). The table 44 is structurally identical to the table 30 described above except that it contains many more rows since, in a concrete embodiment, the number $2^{Nk}$ of samples k is much higher than thirteen and usually higher than $2^{10}$ or $2^{16}$ or $2^{32}$.

The searching module 46 is configured to select, from the table 44, the only sample k for which condition (1) is met, i.e. the condition $F(k-1) < r \leq F(k)$, where r is the received complete random number. For example, here, the module 46 consults the probabilities F(k) contained in column 34 one after the other and in increasing order. Each time the module 46 consults a probability F(k), it compares it to the received random number r. If the number r is strictly higher than the probability F(k), it consults the following probability F(k+1). If the number r is lower than or equal to the probability F(k), the module 46 transmits the sample k associated by the table 44 with this probability F(k).

The table 44 is much larger than the table 20 and the search for the sample k in this table is more complex and takes longer than the search of the table 20. Therefore, the sampler 40 takes, on average, more time to send the sample k than the fast sampler $ER_1$. In contrast, whatever the random number r, the slow sampler 40 is capable of selecting the corresponding sample k whereas this is not the case for the fast sampler $ER_1$. Thus, depending on whether or not the fast sampler uses the slow sampler 40 to obtain the sample k, the time that passes between the time $t_d$ at which the fast sampler receives the number $r_{msb}$ and the time $t_e$ at which the fast sampler $ER_i$ sends, to its output interface 24, the sample k, is very different.

Below, the generator 12 is assumed to start the generation of a random number r each time a sampling interval starts. The duration $T_e$ of this sampling interval is longer than or equal to the time required by a fast sampler to transmit the sample k when it finds this sample k in its table 20. Here, the duration $T_e$ is also shorter than the time required by the sampler 40 to select and transmit the sample k associated with the received complete random number r. Here, the sampling intervals repeat periodically one after the other at a predefined frequency $f_e$.

Under these conditions, each time the fast sampler $ER_i$ finds a sample k associated, by the table 20, with the received number $r_{msb}$, it transmits this sample k before the end of the sampling interval. In contrast, in the inverse case in which the fast sampler does not itself find the sample k in the table 20 and must activate the sampler 40 to obtain this sample k, the sample k is transmitted after the end of the sampling interval. Thus, a fast sampler $ER_i$ used alone is incapable of systematically sending at each sampling-interval end a new sample k.

To increase the regularity of the send times of the samples k, the device 10 implements and combines a plurality of solutions.

Firstly, the device 10 comprises a set 50 of memories for storing samples k in advance. Here, the set 50 comprises one memory $MF_i$ for each fast sampler $ER_i$. Preferably, these memories $MF_i$ are all identical to one another. Thus, only the memory $MF_1$ is described in more detail.

The memory $MF_1$ comprises an input connected to the output interface 26 of the sampler $ER_1$ and an output connected to a respective input of a multiplexer 60. The memory $MF_1$ is a FIFO memory (FIFO being the acronym of first in first out), i.e. a memory that delivers as output the samples k in the same order as the samples k were received and stored. The memory $MF_1$ may store at most $T_{MF}$ samples k. Typically, the number $T_{MF}$ is lower than or equal to 64 and, preferably, lower than or equal to 16. Usually, the number $T_{MF}$ is also higher than two or four. Here, the number $T_{MF}$ is equal to eight.

This memory $MF_1$ allows a plurality of samples k sent by the sampler $ER_1$ to be stored, in advance.

The numbers $a_f$ delivered by the device 10 are extracted, at each sampling-interval end, from one of the memories $MF_i$. More precisely, the multiplexer 60 connects, alternately and cyclically, the output of a memory $MF_i$ to an output 62 of the device 10 to which the number $a_f$ is delivered. Here, at each end of a sampling interval, the multiplexer 60 connects a new memory $MF_i$ to the output 62. Here, the multiplexer 60 connects each memory $MF_i$ one after the other in the order of their index i to the output 62.

If a plurality of samples k are stored in the memory $MF_1$, even if, during a sampling interval, the sampler $ER_1$ is activated and it must use the sampler 40 to obtain the new sample k, it is nonetheless possible to extract, from the memory $MF_1$, at the end of the sampling interval, a new sample k. Thus, the memory $MF_1$ by itself already allows the regularity with which the samples k are transmitted to be improved.

The device 10 also comprises an arbitrating module 70. The module 70 activates, at the start of each sampling interval, a new sampler $ER_i$. For example, the module 70 activates the samplers $ER_i$ cyclically. Here, the module 70 activates the samplers $ER_i$ one after the other in the order of their indices i then returns to the sampler $ER_1$ after having activated the sampler ERS.

Each time a sampler $ER_i$ is activated, it acquires a random number $r_{msb}$ generated by the generator 12 then executes the various processing operations required to obtain and transmit the new sample k. Since these samplers $ER_i$ are activated in turn, a particular sampler $ER_i$ has a time equal to $5T_e$ after having been activated to obtain and send the new sample k. Thus, even if the sampler $ER_i$ must use the slow sampler 40 to obtain the new sample k, the probability that the new sample k is sent before the end of the time $5T_e$, and therefore before the module 70 again activates this same sampler $ER_i$, increases.

Thus, reciprocally, the probability that the memory $MF_i$ completely empties decreases, and the probability that the device 10 will be able to deliver, at each sampling-interval end, a new sample k is therefore higher.

FIG. 5 shows, in more detail, one possible embodiment of the sampler $ER_1$. The interface 28 receives, one after the other, starting with the most significant bit and continuing to the least significant bit, the bits of the random number r generated by the generator 12. The interface 28 also allows the request r_req to trigger the generation of the number $r_{lsb}$ to be sent to the generator 12.

The interface 26 allows the request EL_req, the received complete random number r and an index k_start to be sent to the sampler 40. The index k_start allows the search in the table 44 from a sample k strictly higher than zero to be initialized. The interface 26 also allows the sample k selected by the slow sampler 40 to be received and it to be transmitted to an input B of a multiplexer 84. The interface 26 also receives a signal EL_valid that indicates that the selection of the new sample k by the slow sampler 40 has ended.

The interface 24 allows the new sample k obtained and a signal k_valid to be sent to the memory $MF_1$. The signal k_valid indicates that the new sample k obtained is ready to be stored in this memory.

The fast sampler $ER_1$ comprises a logic gate 80 that, when the first signal r_valid is received, triggers read-out from the table 20 of the content of the cell $C_j$ the index j of which is equal to the received number $r_{msb}$. The content of the cell $C_j$ is then transmitted to a finite-state machine 82 and, in parallel, to an input A of the multiplexer 84.

Figure 7:
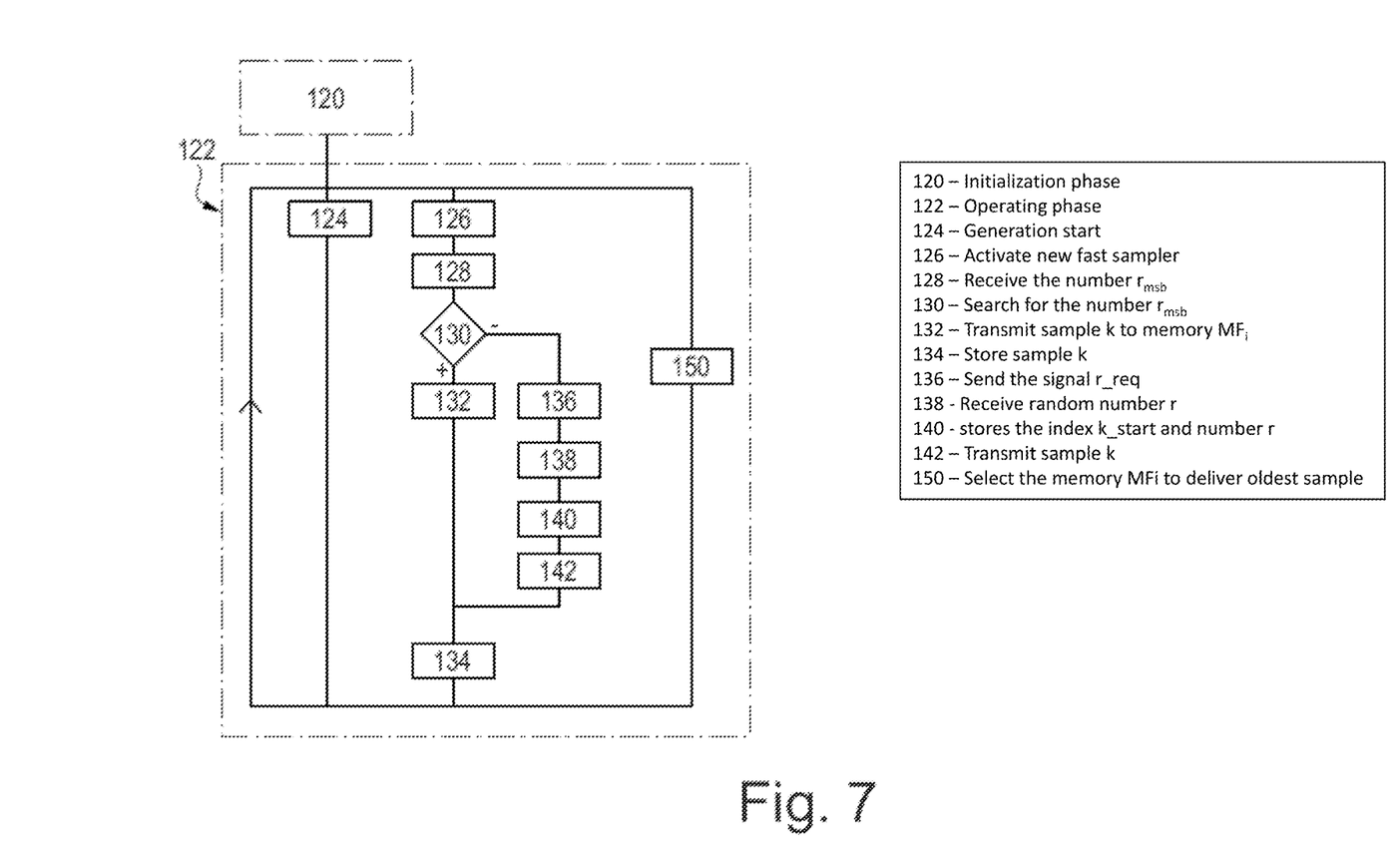
FIG. 7 is a flowchart of a method for generating a random number using the device of FIG. 2.

The machine 82 is configured to implement the method of FIG. 7.

The sampler $ER_1$ also comprises various flip-flops 86 for managing the repetition rate of the various signals sent and received.

Figure 6:
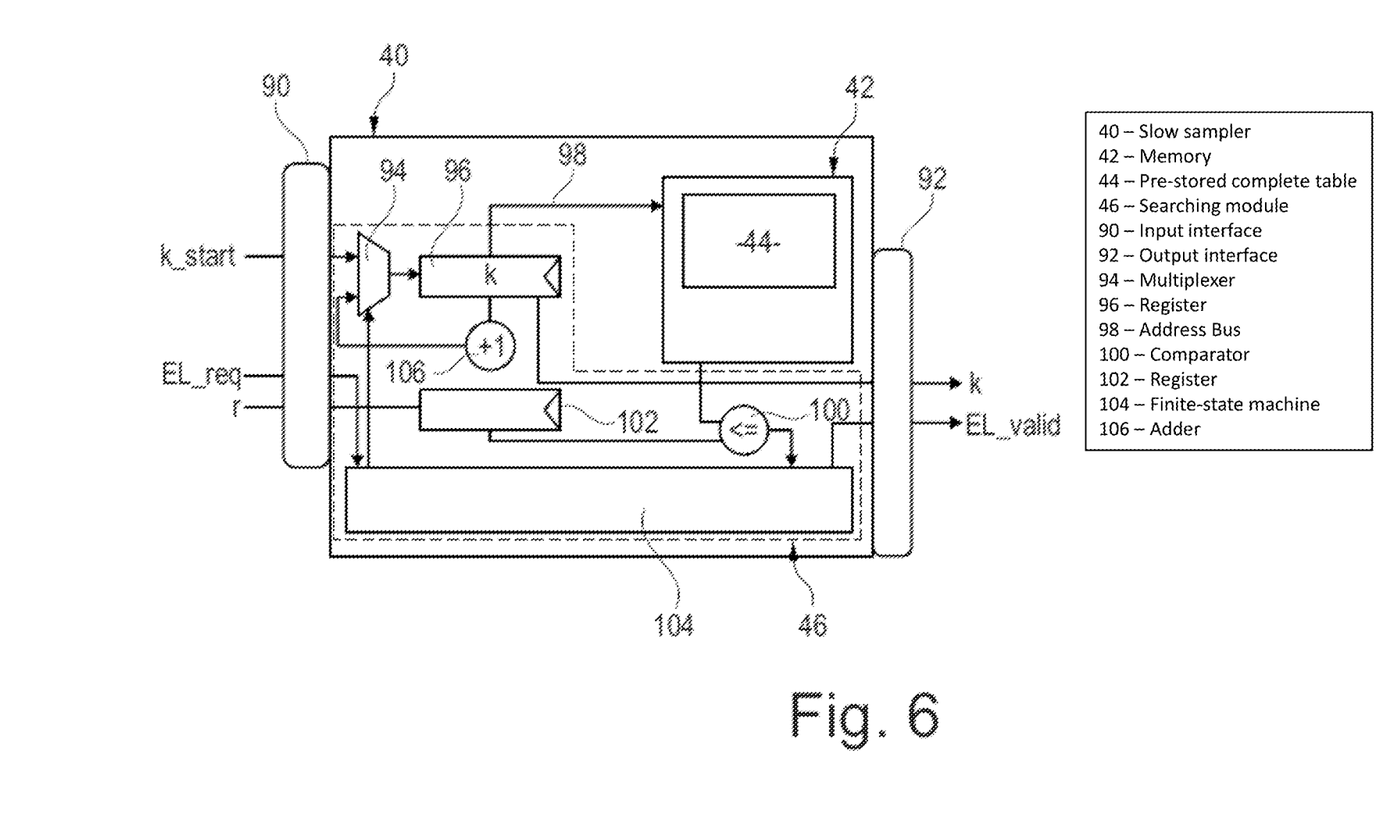
FIG. 6 is a schematic illustration of one possible hardware architecture of a slow sampler implemented in the device of FIG. 2.

FIG. 6 shows one possible embodiment of the slow sampler 40. The slow sampler 40 comprises an input interface 90 and an output interface 92. The interface 90 allows the request EL_req, the complete random number r and the index k_start transmitted by any one of the fast samplers $ER_i$ to be received. The interface 92 allows the selected new sample k and the signal EL_valid to be sent to the sampler $ER_i$ that sent the request EL_req.

The slow sampler 40 comprises a multiplexer 94 that receives, on a first input, the index k_start and the output of which is connected to a register 96 that contains the sample k to be sought in the table 44. An output of the register 96 is also connected to the interface 92 with a view to delivering, to this interface, the selected sample k.

In this embodiment, the slow sampler 40 implements a linear search in the table 44 for the sample k that meets condition (1). In this case, the table 44 is typically a table of only one dimension containing $2^{Nr}$ cells $C_k$. The $2^{Nr}$ cells are classed in order of increasing sample k index. Each cell $C_k$ contains the probability F(k). Thus, in this embodiment, the sample k is also used as index allowing the corresponding probability F(k) to be selected directly from the table 44. To this end, the register 96 delivers, over an address bus 98 connected to the memory 42, the sample k that it contains. In response, the memory 42 delivers, to a first input of a comparator 100, the probability F(k) contained in the cell $C_k$ of index k.

The second input of the comparator 100 is connected to a register 102 that stores the complete random number r received via the interface 90.

An output of the comparator 100 is connected to an input of a finite-state machine 104.

The slow sampler 40 also comprises an adder 106 that increments by one the content of the register 96. The output of the adder 106 is connected to a second input of the multiplexer 94. Thus, by selecting this second input, it is possible to replace the sample k currently contained in the register 96 with the sample k+1.

The machine 104 is configured to implement the method of FIG. 7. To this end, it is notably able to trigger incrementation of the sample k each time the comparator 100 indicates that the selected probability F(k) is lower than the content of the register 102. When, in contrast, the comparator 100 indicates that the selected probability F(k) is higher than or equal to the content of the register 102, the machine 104 causes the signal EL_valid indicating that the sample k present on the interface 92 is the selected sample that meets condition (1) to be sent.

The operation of the device 10 will now be described with reference to the method of FIG. 7.

In a phase 120 of initialization of the device 10, the table 44 is constructed. More precisely, the $2^{Nk}$ probabilities F(k) are computed using the probability distribution ρ that must be implemented by the device 10. Typically, each probability F(k) is obtained by approximating its actual value on $N_r$ bits by rounding. The table 44 thus constructed is then delivered to and stored in the memory 42 of the slow sampler 40.

In phase 120, the number $N_{msb}$ is chosen, for example, experimentally. By way of illustration, to do this, the architecture of the device 10 is simulated on a computer for various possible values of the number $N_{msb}$ and the lowest value of the number $N_{msb}$ from which the time taken to generate ten million samples k no longer decreases substantially is retained. Here, during these simulations, it is also possible to vary the size of the memory $MF_i$. Thus, these simulations allow both the lowest possible number $N_{msb}$ and the lowest possible number $T_{MF}$ for memories $MF_i$ from which the time taken to generate ten million samples k no longer decreases substantially to be determined.

For example, in the case where the number $N_r$ is equal to 128, the standard deviation σ is equal to 3 and the interval I is equal to [−12σ; +12σ], it has been determined that the numbers $N_{msb}$ and $T_{MF}$ must be chosen to be equal to four and eight, respectively, in the case where the level 14 comprises five fast samplers $ER_i$.

At this stage, it will be noted that, depending on the number of samplers $ER_i$ of the level 14, the results will not necessarily be the same. For example, the table below gives optimal values for the numbers $N_{msb}$ and $T_{MF}$ as a function of the number of samplers $ER_i$ in the level 14.

TABLE 1

| Number of samplers $ER_i$ | $N_{msb}$ | $T_{MF}$ (in number of samples k) |
|---|---|---|
| 2 | 4 | 64 |
| 3 | 4 | 16 |
| 4 | 6 | 8 |
| 5 | 4 | 8 |
| 6 | 4 | 8 |
| 7 | 4 | 8 |

It has thus been determined that there seems to be no significant advantage to using more than five fast samplers in the device 10.

Once the number $N_{msb}$ has been chosen, table 20 is constructed using, for example, table 44. Next, the table 20 is delivered to and stored in the memory 18 of each fast sampler $ER_i$.

From this moment, the device 10 is able to generate samples k in an operating phase 122.

In the phase 122, on each start of a sampling interval, in a step 124, the generator 12 starts the generation of a new random number r according to the uniform distribution. Here, the generator 12 generates the bits of the new random number r one after another starting with the most significant bit. The bits of the new random number r are transferred as they are generated to the various samplers $ER_i$. When the $N_{msb}$ most significant bits have been generated, a first signal r_valid is sent to inform the samplers $ER_i$. The generation of the $N_{lsb}$ following bits of the random number r is then suspended. The generation of the $N_{lsb}$ following bits of the random number r is triggered only if a signal r_req is received before the end of the sampling interval. When the generation of the $N_{lsb}$ following bits of the random number r has ended, a second signal r_valid is sent to inform the samplers $ER_i$ that all the bits of the random number r have now been generated.

In parallel, in a step 126, the arbitrating module 70 activates a new fast sampler $ER_i$ at the start of each sampling interval with a view to processing the new random number r generated. Here, the module 70 activates the various fast samplers $ER_i$ cyclically one after the other.

When it is activated, in a step 128, the sampler $ER_i$ receives the number $r_{msb}$.

In a step 130, once it has received all the bits of the number $r_{msb}$, the module 22 searches for this number $r_{msb}$ in the table 20. Here, step 130 is triggered by reception of the first signal r_valid.

If the search is successful, i.e. if the received number $r_{msb}$ is associated with a sample k by the table 20 then, in a step 132, the fast sampler $ER_i$ transmits this sample k to the memory $MF_i$, which stores it. To do this, for example, the machine 82 commands the multiplexer 84 to select the input A, and in parallel, causes the signal k_valid to be sent.

In response to reception of the signal k_valid, in a step 134, the memory $MF_i$ stores the sample k present on the interface 24. In this case, a new sample k is stored in the memory $MF_i$ before the end of the sampling interval. In addition, in this case, the fast sampler $ER_i$ does not send the signal r_req, this inhibiting the generation of the $N_{lsb}$ following bits of the random number r by the generator 12.

If the search is unsuccessful, i.e. if the received number $r_{msb}$ is associated with the failure symbol "?" by the table 20, then, in a step 136, the fast sampler $ER_i$ sends the signal r_req with a view to triggering the generation, by the generator 12, of the $N_{lsb}$ following bits of the random number r.

When all of the bits of the new random number r have been generated and received, the fast sampler $ER_i$ sends the sampling signal EL_req to its interface 26. At the same time, the complete random number r and the index k_start are delivered to the slow sampler 40 via this same interface 26. Here, this is triggered by reception of the second signal r_valid. The index k_start is set equal to the first sample k that precedes the symbol "?" associated with the received number $r_{msb}$ in the table 20.

In a step 138, the slow sampler 40 receives this random number r, the request EL_req and the index k_start.

In response, the sampler 40 triggers a slow-sampling step 140. In this step 140, the sampler 40 stores the index k_start in the register 96 and the received number r in the register 102. This triggers read-out from the table 44 of the probability F(k). The probability F(k) is compared to the number r contained in the register 102 by the comparator 100. If the number r is lower than or equal to this probability F(k) read from the table 44, the machine 104 generates the signal k_valid.

If the number r is higher than the probability F(k) read from the table 44, the machine 104 increments by one the content of the register 96. Thus, the content of the register 96 is incremented by one until the probability F(k) read from the table 44 is higher than or equal to the number r contained in the register 102. The sample k contained in the register 96 is continuously present on the output interface 92.

In response to reception of the signal EL_valid, in a step 142, the machine 82 of the fast sampler $ER_i$ transmits, to its interface 24, the sample k selected by the slow sampler 40 and sends the signal k_valid.

Next, the method continues with the step 134 of storing this new sample k in the memory $MF_i$.

In the latter case, the new sample k is not present on the interface 24 before the end of the sampling interval but, generally, before the end of the period $5T_e$ and therefore before the module 70 activates this same fast sampler $ER_i$ again.

In the case where the new sample k is not present at the end of the period $5T_e$, the module 70, for example, waits for this new sample k to be present on the interface 24 then proceeds to step 134 then immediately reactivates this sampler $ER_i$ with a view to processing a new random number r. In this case, the number of samples k contained in the memory $MF_i$ decreases.

Specifically, in parallel to steps 126 to 134, in a step 150, at each sampling-interval end, the multiplexer 60 selects the memory $MF_i$ to deliver, by way of number $a_I$ to the output 62, the oldest of the samples stored in this memory $MF_i$. Thus, the multiplexer 60 selects the memories $MF_i$ cyclically one after another. In the case where the selected memory $MF_i$ is empty, the multiplexer 60 waits for the sampler $ER_i$ to have finished generating the new sample k then immediately transmits it to the output 62. Thus, the device 10 is incapable of delivering, before the end of the sampling interval, a new sample k to its output 62 only if:

the memory $MF_i$ selected by the multiplexer 60 is empty, and the activated sampler $ER_i$ needs to use the slow sampler 40 to generate the new sample k.

Section III: Variants

III.1—Variants of the Slow Sampler

In one simplified embodiment, the index k_start is not employed. In this case, the search in the table 44 starts for example systematically with the sample k=0.

The slow sampler may implement methods for searching for the sample k in the table 44 other than a linear search such as that described above. For example, the sampler 40 may, instead, implement a binary search or a search in which it scans the probabilities F(k) in decreasing order or even a search in which the probabilities F(k) are consulted and selected randomly until the correct sample k is found.

The level 16 may also comprise a plurality of slow samplers. In this case, for example, the slow samplers are activated one after another. For example, in response to a first failure signal sent by a first fast sampler, the first slow sampler is activated to process this first failure signal. If a second failure signal is sent before the first slow sampler has finished its processing operations, a second slow sampler is activated to generate the new sample k in response to this second failure signal and so on. In another embodiment, each slow sampler is associated with a respective group of one or more fast samplers and only processes failure signals sent by the fast samplers of this group. In one particular case, there may be as many slow samplers as there are fast samplers. In the latter case, each slow sampler is, for example, associated with its own fast sampler.

III.2. Variants of the Fast Sampler

As a variant, the device 10 comprises as many generators of random numbers r as fast samplers or indeed one generator of random numbers r capable of generating, during each sampling interval, as many random numbers r as there are fast samplers $ER_i$. In this case, all the fast samplers may be activated simultaneously and in parallel. This allows the number of samples k generated in each sampling interval to be increased and therefore the memories $MF_i$ to be filled more rapidly.

In one simplified embodiment, the device comprises a single fast sampler $ER_1$. In this case, the arbitrating module 70 is omitted. This single fast sampler $ER_1$ may nonetheless fill the memory $MF_1$ in advance. For example, this single fast sampler $ER_1$ fills the memory $MF_1$ during time intervals in which it is not necessary to deliver random numbers $a_I$ to a third-party software package.

Instead of solely having a first level of fast samplers, such as the level 14, the device 10 may comprise, as a variant, an intermediate level of fast samplers before the level 16. The intermediate level is a group of one or more additional fast samplers. The fast samplers of the intermediate level are, for example, identical to the fast samplers of the level 14, except that the truncated table 20 is replaced by a truncated table in which the random number $r_{msb}$ is coded on $(N_{msb}+N_{sb2})$ bits, where $N_{sb2}$ is a number of bits higher than or equal to one and lower than $(N_r-N_{msb})$. In the case where there is an intermediate level of fast samplers, the device for generating random numbers for example operates in the following way. The failure signal sent by a fast sampler of the level 14 is received by a fast sampler of the intermediate level. This fast sampler of the intermediate level also receives the number $r_{msb}$ and the $N_{sb2}$ following bits of the random number r generated by the generator 12. The concatenation of the number $r_{msb}$ and of the $N_{sb2}$ following bits forms a truncated random number $r_{msb2}$. The fast sampler of the intermediate level searches in its truncated table for the number $r_{msb2}$. If it finds the number $r_{msb2}$, it transmits the sample k associated, by its truncated table, with this number $r_{msb2}$. In the contrary case, it sends a failure signal that is received and processed by the slow sampler 40. According to the same principle, it is possible to design a device for generating random numbers that comprises a plurality of intermediate levels.

As a variant, all the fast samplers $ER_i$ of the level 14 are not identical to one another. For example, they differ from one another in their table 20. For example, the various tables 20 do not all contain the same number of cells.

Other embodiments of the table 20 are possible. As a variant, the table 20 contains two columns. The first column contains only the numbers $r_{msb}$ associated with a sample k. The second column contains the sample k associated with the number $r_{msb}$. In this case, each time that a number $r_{msb}$ is received by the searching module 22, this module 22 compares this received number $r_{msb}$ to the various numbers $r_{msb}$ contained in the first column of the table 20. If the received number $r_{msb}$ is equal to one of the numbers $r_{msb}$ of the first column, the sample 4 associated with this number $r_{msb}$ is selected. To do this, the searching module 22 comprises one or more comparators that are able to work in parallel. Each comparator is configured to compare the value of the received number $r_{msb}$ to a preset number $r_{msb}$ contained in the first column of the table 20. For example, the searching module comprises as many comparators as there are numbers $r_{msb}$ contained in the first column of the table 20. In the latter case, the module 22 is also capable of finding, in a single sampling interval, the received number $r_{msb}$ in this table 20. In the case where no number $r_{msb}$ of the first column corresponds to the received number $r_{msb}$, the sampler generates the failure signal.

In one particular embodiment, the table 20 contains only some of the numbers $r_{msb}$ for which condition (2) is met. For example, table 20 contains only the numbers $r_{msb}$ associated with the samples k that appear the most frequently. Thus, in the case where the distribution ρ is a Gaussian distribution, the table 20 contains, for example, only numbers $r_{msb}$ lower than a preset threshold $S_1$, where the threshold $S_1$ is lower than or equal to the highest number $r_{msb}$ that meets condition (2). This allows the size of the table 20 to be decreased without proportionally increasing the number of times that the slow sampler is activated.

Other symbols than the symbol "?" may be used as failure symbol. For example, the failure symbol may also simply be an empty cell.

Section III.3: Other Variants:

As a variant, in each sampling interval, the generator generates all of the $N_r$ bits of the new random number r even if the fast sampler is capable of delivering the new sample k without using the table 44. In this case, the generation of the $N_{lsb}$ following bits of the random number r is never inhibited.

As a variant, the device 10 may be implemented entirely in the form of a software package executable by a programmable microprocessor of a computer.

In another embodiment, a single memory $MF_c$ is common to a plurality of fast samplers. In this case, this group of a plurality of fast samplers each store the samples k that they transmit in the same memory $MF_c$. In one particular case, the device 10 comprises a single memory $MF_c$ common to all of the fast samplers of the level 14. In one simplified variant, all the memories $MF_i$ are omitted.

The distribution ρ is not necessarily a Gaussian distribution. What has been described and taught here applies to any nonuniform, discrete and bounded probability distribution. For example, as a variant, the distribution ρ is a binomial probability distribution or a geometric probability distribution or a Poisson distribution. In this case, it is therefore the cumulative probability density F that must be adapted depending on this new distribution ρ.

As a variant, the device 10 may comprise a conversion table that associates, with each order number of a sample k, a corresponding numerical value in the interval I. In this case, the value of the sample k is not directly equal to its order number but to the value associated with this order number by this conversion table. In the conversion table, the numerical values are classed in increasing order and separated from one another by a regular interval.

As a variant, in the case where the distribution ρ is symmetric with respect to the sample k=0, instead of using the distribution ρ, the corresponding positive distribution ρ' is used. In this case, the fast and slow samplers such as described above generate a sample k'. Subsequently, the sample k' is converted into a sample k as described in section I, i.e. by drawing a random bit b according to a uniform distribution then by multiplying the sample k' by +1 or −1 depending on the value of this drawn random bit.

Section IV: Advantages of the Described Embodiments.

It has been observed that for particular random numbers r generated by the generator 12, it is possible to identify the corresponding sample k for which condition (1) is met using only the $N_{msb}$ most significant bits of this random number. The table 20 solely contains the information required to associate certain or all of these particular random numbers $r_{msb}$ with the corresponding sample k. The table 20 therefore contains far fewer cells than the table 44. The table 20 is therefore much smaller than the table 44 and the search for the sample k in this table 20 is far faster than the search for the sample k in the table 44. Thus, when the random number r generated by the generator 12 is one of these particular random numbers, the fast sampler is capable of sending the new sample k much more rapidly than if the slow sampler were used to do the same job. Using the slow sampler to obtain the sample k when the fast sampler fails, allows, despite use of the fast sampler and of the table 20, the new sample k to be systematically sent for all the random numbers r generated by the generator 12.

Using a fast sampler in addition to the slow sampler allows, without deviating from the chosen distribution ρ, the rate of generation of samples k to be increased and therefore sampling latency to be decreased.

Using a plurality of fast samplers that are activated in turn at the start of each sampling interval allows the probability that the device 10 delivers a new sample k at the end of a single sampling interval to be increased. In addition, since the slow sampler then works in parallel with one or more fast samplers, this also allows a sample k to be sent even if the slow sampler has not finished all its processing operations. Thus, use of a plurality of fast samplers in parallel with the slow sampler allows the rate of generation of samples k to be further increased.

Using a single slow sampler common to a plurality of fast samplers decreases the bulk of the device 10 without however substantially decreasing the rate of generation of samples k.

The use of a FIFO memory allows a plurality of samples k to be stored in this memory in advance then these samples k to be delivered at each sampling-interval end independently of whether it is necessary to activate the slow sampler to obtain the new sample k. This therefore allows the regularity with which the samples k are delivered to be increased. Increasing regularity reinforces the robustness of the device 10 to attacks based on temporal analysis. Specifically, the rate of generation of samples k on the output 62 no longer then necessarily depends on whether or not the slow sampler is activated.

The fact that the number $N_{msb}$ is at least five times lower than the number $N_r$ allows a very small table 20 and therefore a sampler $ER_i$ that is much faster than the slow sampler to be obtained. This therefore contributes to further increasing the rate of generation of samples k.

The fact that the number $N_r$ is at least two times higher than the number $N_k$ allows a discrepancy between the discrete and bounded distribution ρ and its continuous version that is very small to be obtained.

Inhibiting the generation of the $N_{lsb}$ least significant bits of the random number r to each time the fast sampler successfully transmits a new sample k using only the table 20, limits the power consumption of the device 10.

Storing the sample k in a cell the index of which is equal to the number $r_{msb}$ that meets condition (2) and, in the other cells, a failure symbol, makes it possible to determine whether the sample k corresponding to the received number $r_{msb}$ exists in a single read operation. Under these conditions, the search of the table 20 is very fast. This allows the rate of generation of samples k to be further increased.

The invention claimed is:

1. A device for generating a discrete random number, this random number being coded on $N_k$ bits and drawn according to a nonuniform, discrete and bounded probability distribution ρ, this device comprising:
a microprocessor configured to implement
  a generator of random numbers that are coded on $N_r$ bits and drawn according to a uniform distribution, the number $N_r$ being a positive integer number higher than or equal to the number $N_k$,
  a slow sampler comprising:
  a complete table associating, with each possible probability F(k) of the cumulative probability density F of the distribution ρ, the corresponding sample k coded on $N_k$ bits, each probability F(k) being coded on $N_F$ bits, the number $N_F$ being higher than the number $N_k$ and lower than or equal to the number $N_r$,
  a first searching module able:
  to receive the $N_r$ bits of a random number r generated by the generator,
  in response, to select, from the complete table, the only probability F(k) such that $F(k-1) < r \leq F(k)$, then
  to transmit the sample k, associated by the complete table with the selected probability F(k), of as the discrete random number drawn according to the distribution ρ,
  a fast sampler ($ER_i$) comprising:
  a truncated table, which is smaller than the complete table, associating with truncated random numbers $r_{msb}$ coded only on $N_{msb}$ bits, the only sample k for which, whatever a number $r_{lsb}$ belonging to an interval $[0; 2^{Nr-Nmsb}-1]$, the following condition is met: $F(k-1) < (r_{msb}, r_{lsb}) \leq F(k)$, where:
  $(r_{msb}, r_{lsb})$ is the binary number coded on $N_r$ bits and the $N_{msb}$ most significant bits of which are equal to the $N_{msb}$ bits of a truncated random number $r_{msb}$ and the $(N_r-N_{msb})$ least significant bits of which are equal to the $(N_r-N_{msb})$ bits of the number $r_{lsb}$,
  $N_{msb}$ is a positive integer number lower than $N_r$,
  a second searching module able:
  to acquire the $N_{msb}$ most significant bits of the random number r generated by the generator, these $N_{msb}$ bits forming a received truncated random number $r_{msb}$,
  in response, to search for the received truncated random number $r_{msb}$ in the truncated table, and if the search is successful, to transmit the sample k, associated, by the truncated table, with the received truncated random number $r_{msb}$, as the discrete random number drawn according to the distribution ρ, and, alternatively, if the search is unsuccessful, to send a failure signal, and
the slow sampler is able to:
  receive the failure signal and the random number r generated by the generator and the $N_{msb}$ most significant bits of which are equal to the truncated random number $r_{msb}$ that led to this failure signal being sent, then
  in response, to select, using the complete table, and to transmit the only sample k that meets the condition $F(k-1) < r \leq F(k)$ and that was unable to be transmitted by the fast sampler,
the generator is able to generate a new random number r at the start of each sampling interval, these sampling intervals being repeated periodically,
wherein the device comprises:
  a plurality of fast samplers each able to work in parallel with the other fast samplers and in parallel with the slow sampler, and
  an arbitrating module able to activate, on each new sampling interval, a new fast sampler different from the fast sampler activated in the preceding sampling interval, to process the $N_{msb}$ bits of the random number r generated at the start of this new sampling interval, with this new activated fast sampler.

2. The device as claimed in claim 1, wherein the slow sampler is able, for each of the fast samplers, to receive:
the failure signal generated by this fast sampler, and
the random number r that led to the generation of this failure signal.

3. The device as claimed in claim 1, wherein:
the device comprises a memory able:
to receive and to store each transmitted sample k, and
to deliver as output from the device, at the end of each sampling interval and provided that there are samples k stored in this memory, the oldest stored sample k.

4. The device as claimed in claim 3, wherein:
the number of fast samplers is comprised between three and five,
the size of the memory allows at most $T_{MF}$ samples k to be stored, where the number $T_{MF}$ is comprised between eight and sixteen, and
the number $N_{msb}$ is comprised between four and six.

5. The device as claimed in claim 1, wherein the number $N_{msb}$ is five times smaller than the number $N_r$.

6. The device as claimed in claim 1, wherein the number $N_r$ is a positive integer number at least two or four times higher than the number $N_k$.

7. The device as claimed in claim 1, wherein the generator is able to firstly generate the $N_{msb}$ bits of the random number r and, the fast sampler is able to inhibit the generation, by the generator, of the $(N_r-N_{msb})$ bits following the random number r each time the search in the truncated table is successful.

8. The device as claimed in claim 1, wherein:
the truncated table contains $2^{Nmsb-s}$ cells ordered in order of increasing index, where s is a positive or zero integer number lower than $N_{msb}$, each sample k associated, by the truncated table, with a corresponding truncated random number $r_{msb}$ comprised between 0 and $2^{Nmsb-s}-1$ being stored in the cell the index of which is equal to this corresponding truncated random number $r_{msb}$, the other cells that contain no sample k containing a failure symbol different from all the samples k, and the second searching module is able to directly read the content of the cell in the truncated table the index of which is equal to the received truncated random number $r_{msb}$ searched for in this truncated table and, when the read content is a sample k, to transmit this sample k, and when the read content is the failure symbol, to send the failure signal.

9. The device as claimed in claim 1, wherein the distribution ρ is a discrete and bounded Gaussian probability distribution.

10. A method for generating a discrete random number, this random number being coded on $N_k$ bits and drawn according to a nonuniform, discrete and bounded probability distribution ρ, this method comprising:
 a step of providing a complete table associating, with each possible probability F(k) of the cumulative probability density F of the distribution ρ, the corresponding sample k coded on $N_k$ bits, each probability F(k) being coded on $N_F$ bits, the number $N_F$ being higher than the number $N_k$ and lower than or equal to a number $N_r$,
 a step of generating random numbers each coded on $N_r$ bits and drawn according to a uniform distribution, the number $N_r$ being a positive integer number higher than or equal to the number $N_k$, this generating step comprising the generation of a new random number r at the start of each sampling interval, these sampling intervals being repeated periodically,
 a slow-sampling step, this step comprising:
 receiving the $N_r$ bits of a random number r generated by the generator,
 in response, selecting, from the complete table, the only probability F(k) such that F(k−1)<r≤F(k), then
 transmitting the sample k, associated by the complete table with the selected probability F(k), as the discrete random number drawn according to the distribution ρ,
 providing a truncated table, which is smaller than the complete table, associating with truncated random numbers $r_{msb}$ coded only on $N_{msb}$ bits, the only sample k for which, whatever a number $r_{lsb}$ belonging to an interval [0; $2^{Nr-Nmsb}$−1], the following condition is met: F(k−1)<($r_{msb}$, $r_{lsb}$)≤F(k), where:

($r_{msb}$, $r_{lsb}$) is the binary number coded on $N_r$ bits and the $N_{msb}$ most significant bits of which are equal to the $N_{msb}$ bits of the truncated random number $r_{msb}$ and the ($N_r$−$N_{msb}$) least significant bits of which are equal to the ($N_r$−$N_{msb}$) bits of the number $r_{lsb}$,
$N_{msb}$ is a positive integer number lower than $N_r$,
a fast-sampling step, this step comprising:
 receiving the $N_{msb}$ most significant bits of the random number r generated by the generator, these $N_{msb}$ bits forming a received truncated random number $r_{msb}$,
 in response, searching for this received truncated random number $r_{msb}$ in the truncated table, and
 if the search is successful, transmitting the sample k, associated, by the truncated table, with the received truncated random number $r_{msb}$, as the discrete random number drawn according to the distribution ρ, and, alternatively, if the search is unsuccessful, sending a failure signal, then
in response to the reception of the failure signal and of the random number r generated by the generator and the $N_{msb}$ most significant bits of which are equal to the truncated random number $r_{msb}$ that led to this failure signal being sent, triggering the execution of the slow-sampling step with a view to selecting, using the complete table, and transmitting the only sample k that meets the condition F(k−1)<r≤F(k) and that was unable to be transmitted at the end of the fast-sampling phase,
wherein the method comprises:
providing a plurality of fast samplers each able to work in parallel with the other fast samplers and in parallel with the slow sampler, and
activating, on each new sampling interval, a new fast sampler different from the fast sampler activated in the preceding sampling interval, to process the $N_{msb}$ bits of the random number r generated at the start of this new sampling interval, with this new activated fast sampler.

11. A non-transitory data-storage medium that is readable by a microprocessor, wherein this medium comprises instructions for executing a method as claimed in claim 10, when these instructions are executed by the microprocessor.

* * * * *